UNITED STATES PATENT OFFICE.

OSCAR FREDRIK CARLSON, OF STOCKHOLM, SWEDEN.

PROCESS OF MAKING NITROGEN COMPOUNDS.

No. 903,541.

Specification of Letters Patent.

Patented Nov. 10, 1908.

Application filed July 19, 1906. Serial No. 326,841.

*To all whom it may concern:*

Be it known that I, OSCAR FREDRIK CARLSON, a subject of the King of Sweden, and resident of Kornhamnstorg 4, Stockholm, in the Kingdom of Sweden, have invented certain new and useful Improvements in Processes of Making Nitrogen Compounds, of which the following is a specification.

This invention relates to certain improvements in the art of producing nitrogenous compounds, and more particularly in the artificial production of nitrogenous compounds such as are especially adapted for use as fertilizers, and the object of the invention is, in part, to improve and simplify the production of such compounds whereby certain economic advantages are attained in the manufacture thereof and, in part, to provide a compound of this character of a novel and comparatively inexpensive nature which shall afford certain important advantages for use, all as will be hereinafter fully set forth.

The novel features of the invention will be carefully defined in the claims.

It is well known that nitrogen gas, when passed over a carbid of an alkaline earth metal, is absorbed with production of a nitrogenous compound which is well suited for use as a fertilizer. Where calcium carbid is employed in this manner, the resultant product consists of calcium-cyanamid and carbon, and where barium carbid is employed, the resultant product consists of barium-cyanamid, barium carbid, barium cyanid and carbon. The commercial calcium carbid has been considered to be most suitable for employment in this manner, and in order to carry out the reaction upon an industrial scale without the addition of any other material, it has been found necessary to subject the calcium carbid to a temperature of from about 1100°C. to 1200° C. in order to secure good results, but this high temperature has occasioned great difficulty in the carrying out of the process, and has rendered the same so expensive that it is not well suited for practical utilization. For this reason attempts have been made to carry out the reaction at lower temperatures by the addition of chlorid of calcium, or a clorid of some other alkaline earth, or of an alkali metal, and in this way valuable technical results have been attained, whereby the artificial production of nitrogenous compounds is rendered much more practical and economical. But when these mixtures are employed a considerable proportion of calcium chlorid will be present in the product, and a great disadvantage has been encountered by reason of the hygroscopic nature of this compound, which caused the finished product to accumulate moisture to such a degree as to prevent it from being readily applied to the ground for use, and results in the bursting of sacks, etc., during storage of the product.

According to my invention I add to the calcium carbid a suitable percentage of a fluorid of an alkali or alkaline earth metal, or a plurality of fluorids, and the resulting mixture, on being subjected to a temperature of from about 700° C. upwards, is capable of absorbing a comparatively great percentage of nitrogen gas. Furthermore such absorption is more rapidly effected where the process is conducted with the addition of one or more fluorids according to my invention.

In carrying out my invention in practice, I have found that an admixture of from $\frac{1}{10}$ per cent. upwards to 30 per cent. of fluor spar with the calcium carbid gives excellent results, but I prefer to employ from 2 to 5 per cent. of this substance, and in respect of the temperature I prefer to take advantage of the exothermic nature of the reaction and to so conduct the process that the material is subjected to a temperature of from about 800° to 900° C., which temperature is attained in part by the exterior heating, and in part by the heat developed by the reaction between the nitrogen and the carbid of calcium. Through this range of temperature the absorption of nitrogen is very energetic and complete, so much so that almost the full volume of nitrogen which can be theoretically taken up by the calcium carbid to transform it into calcium-cyanamid, is absorbed in a comparatively short time. If desirable, a similar result may be attained by heating the mixture of carbid and fluorid to a lower temperature than 700° C., and heating the nitrogen to a higher temperature, say 1000° to 1200° C., and bringing the nitrogen, while thus heated, in contact with the mixture, whereupon the temperature at the surface of the mixture will soon rise above 700° C., and the reaction will commence, developing a considerable heat which will aid in maintaining the reaction.

It may be stated that in carrying out my improved process no result of practical importance can ordinarily be attained where the reaction is conducted at a temperature less than 700° C.

In order to insure the best results, the materials should, of course, be properly ground and mixed. I take for example, an admixture of 3 parts of fluor spar with 97 parts of calcium carbid and lead the nitrogen over the same, meanwhile employing sufficient external heat to maintain such mixture at a temperature of 750° C. Such external heating will be sufficient to bring about the commencement of the reaction, and during the continuance of the reaction sufficient heat will be developed by its exothermic nature to raise the temperature of the mixture to about 900° C. By this procedure products are obtained containing as much as 23 per cent. of nitrogen. The percentage of nitrogen contained in the finished product will, however, be dependent upon the percentage of $CaC_2$ contained in the particular specimen of commercial calcium carbid employed. The resultant product manufactured according to my invention is especially desirable for use by reason of the high percentage of nitrogen contained in it, and also by reason of the elimination of the hygroscopic properties possessed by the products resulting where calcium chlorid is employed, since there is no difficulty encountered either in storing or spreading the improved fertilizer compound, nor any tendency to excessive loss of the fertilizer after the same has been spread upon the ground, due to too ready solubility.

Owing to the general similarity of properties existing between the compounds of alkaline earth metals and of alkali metals, it will be apparent to those skilled in the art that in my improved process the fluorids of the metals of the one group may usually be substituted for the corresponding compounds of the other group without departure from the principles and spirit of the invention.

Having thus described my invention, what I claim and desire to secure by Letters Patent is—

1. The herein described process of producing nitrogenous compounds which consists in exposing a mixture of a carbid of an alkaline earth metal with a fluorid to the action of nitrogen gas under circumstances such that the nitrogen and the mixture are brought into contact with each other at or above a temperature of about 700° C.

2. The herein described process of producing nitrogenous compounds, which consists in subjecting a mixture of a carbid of an alkaline earth metal and a fluorid to a temperature of not less than 700° C. in presence of nitrogen gas.

3. The herein described process of producing nitrogenous compounds which consists in exposing a mixture of calcium carbid with a fluorid to the action of nitrogen gas under circumstances such that the nitrogen and the mixture are brought in contact with each other at or above a temperature of about 700° C.

4. The herein described process of producing nitrogenous compounds which consists in exposing a mixture of calcium fluorid with a carbid of an alkaline earth metal to the action of nitrogen gas under circumstances such that the nitrogen and the mixture are brought in contact with each other at or above a temperature of about 700° C.

5. The herein described process of producing nitrogenous compounds which consists in exposing a mixture of the carbid of an alkaline earth metal with the fluorid of an alkaline earth metal to the action of nitrogen gas under circumstances such that the nitrogen and the mixture are brought in contact with each other at or above a temperature of about 700° C.

6. The herein described process of producing nitrogenous compounds which consists in exposing a mixture of calcium carbid with calcium fluorid to the action of nitrogen gas under circumstances such that the nitrogen and the mixture are brought in contact with each other at or above a temperature of about 700° C.

In witness whereof I have hereunto signed my name this 3 day of July 1906, in the presence of two subscribing witnesses.

OSCAR FREDRIK CARLSON.

Witnesses:
CARL TRIBEY,
AXEL EHRNER.